Aug. 21, 1951
M. F. KEMPER
2,565,029
CLOSURE MECHANISM
Filed Jan. 13, 1947
2 Sheets-Sheet 2
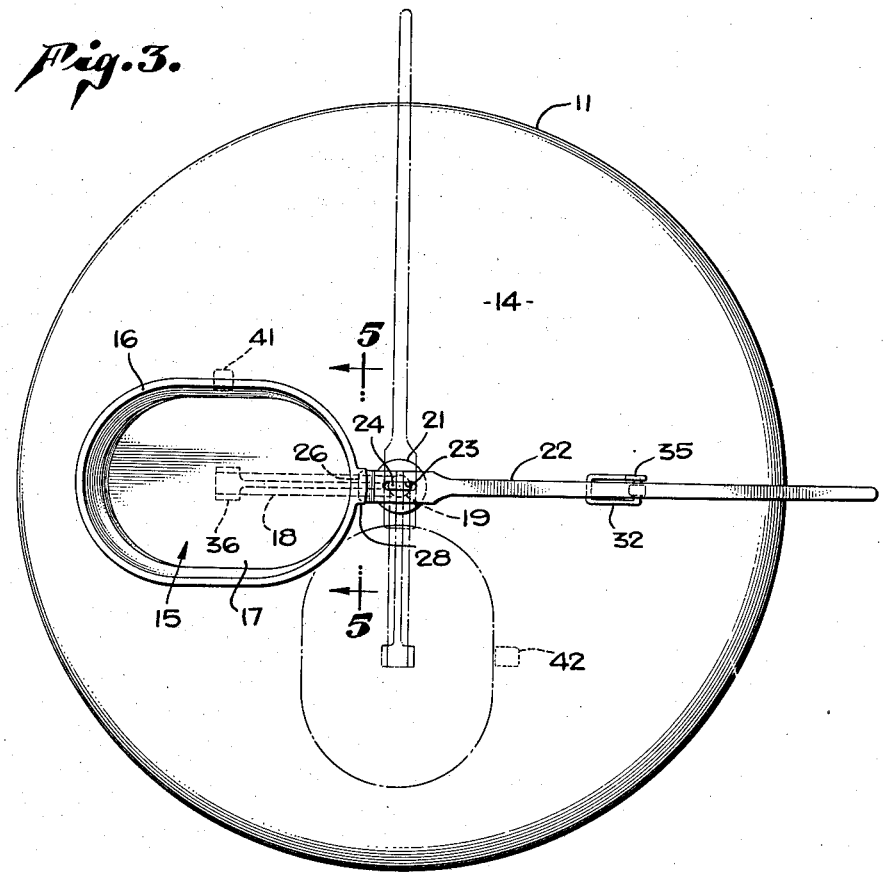
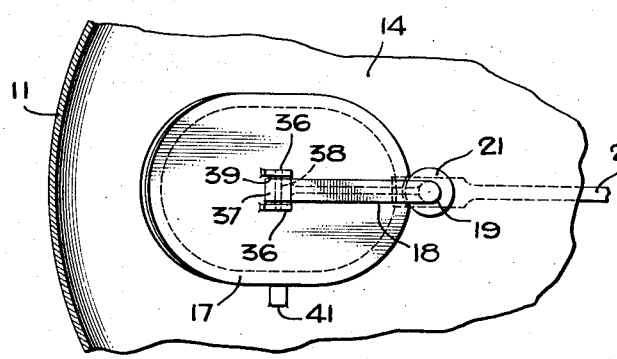
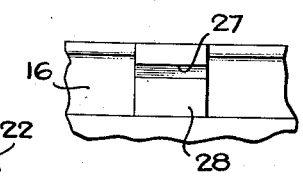
Maxwell F. Kemper
INVENTOR.
BY
Paul A. Weilein
ATTORNEY Patented Aug. 21, 1951

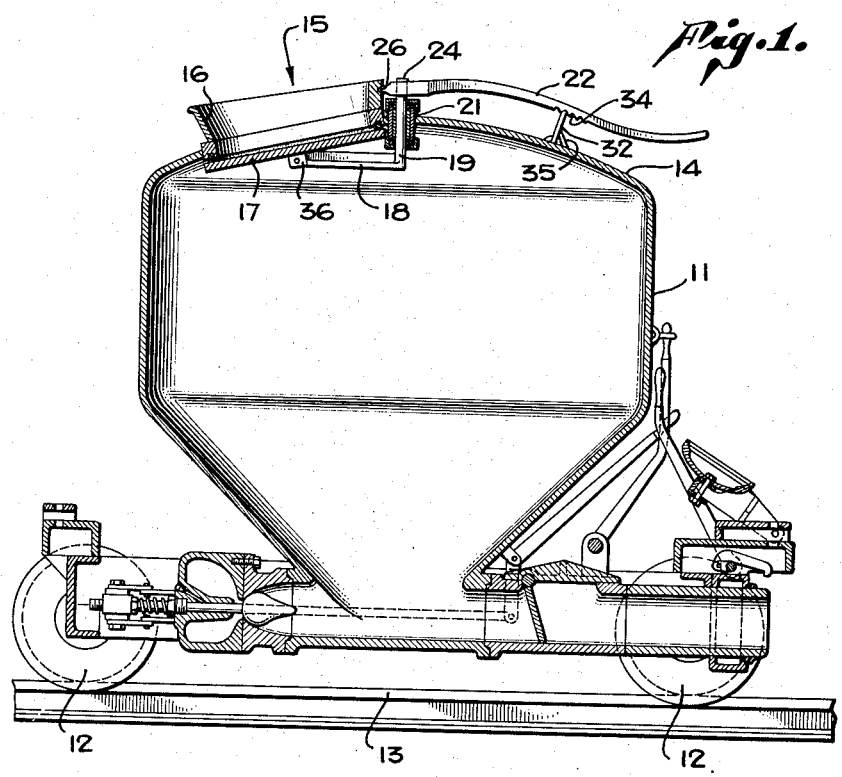
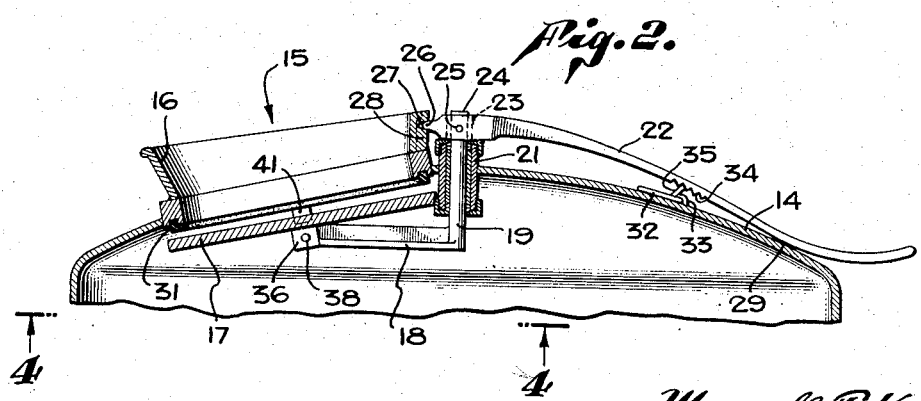

2,565,029

UNITED STATES PATENT OFFICE 2,565,029

CLOSURE MECHANISM

Maxwell F. Kemper, Los Angeles, Calif.

Application January 13, 1947, Serial No. 721,718

12 Claims. (Cl. 220—33)

This invention relates generally to closure devices for closing openings in walls, and is directed more particularly to improvements in a closure device for sealing an opening in the wall of a receptacle or vessel subjected to relatively high internal pressure.

It is frequently desirable or even necessary to seal an opening in a wall by a closure member which is disposed on one side of the wall, and to provide actuating means disposed on the other side of the wall for manipulating the closure member into sealing relation with the opening or into a position entirely clear of the opening. This is particularly true in the case of a pressure vessel having an opening therein through which material is delivered into the vessel, and which is subjected to relatively high internal pressure after being charged with material. In such instances it is advantageous to dispose the closure member within the vessel in order that it may seal the opening at the inner side thereof and thus utilize the internal pressure to force the closure member into fluid-tight sealing engagement with the wall of the opening.

It is a general object of this invention to provide closure means associated with an opening in a wall and incorporating therein novel and improved means for mounting the closure member on one side of the wall for movement into or out of sealing relation with the opening, and also incorporating therein actuating means disposed on the other side of the wall for manipulating the mounting means to move the closure member as aforesaid.

It is advantageous in many instances to mount the closure member for movement into an open position offset from the opening but close to the wall in which the opening is formed. The necessity or desirability of this arrangement may be prompted by space limitations or, as in the case of a vessel or container adapted to be almost completely filled with material through an opening in its upper wall, by the advantages which accrue from avoiding forcing the closure member through the mass of material when moving it to closed position after the vessel is filled.

A typical example of the foregoing is that of a vessel for transporting cementitious material to the site of tunnel lining operations. A vessel of the type commonly used for this purpose is disclosed in my U. S. Patent No. 2,313,826, and comprises generally a closed container having a filling opening in its upper wall, the lower portion of the container forming a hopper from which the material flows downwardly into a horizontally extending conduit. Compressed air is admitted to one end of the conduit and is mixed with the cementitious material and functions as a fluid conveying medium for conveying the material through a conduit to the point of use. Inasmuch as the interior of the vessel is in open communication with the conduit, it is subjected to internal pressure, and hence it is necessary to seal the filling opening.

Obvious advantages are derived from the provision of closure means for the filling opening in a vessel of the abovementioned type, wherein the closure member is disposed within the vessel and is movable from its sealing position to an open position offset laterally from the opening and close to the upper wall of the vessel. When the closure member is in sealing position the internal pressure augments the sealing effect. The sealing surface, being on the inner side of the opening, is not exposed to the flow of material entering the opening. The closure member need not be forced through the mass of material when it is moved to closed position. Other obvious advantages are inherent in such an arrangement.

However, closure devices of the foregoing type which have heretofore been employed have had certain defects and shortcomings offsetting to a considerable extent the advantages of this type of closure device. In most instances the actuating mechanism has been disposed within the vessel where it is obviously subject to becoming clogged by the material and rendered inoperative. It is necessary to move the closure member sequentially in angularly related directions, to first move it inwardly away from the sealing surface around the opening and then move it laterally out of registry with the opening. In the prior devices the mechanism for effecting sequential movement of the closure member in angularly related directions has been both intricate and cumbersome. In many instances it has been operated by compressed air or other power.

It is another object of this invention to provide closure means for a pressure vessel, embodying an internal closure member and actuating means of an extremely simple and rugged nature, so disposed as to be free from clogging by the material with which the vessel is charged.

A still further object of this invention is to provide closure means for a pressure vessel, wherein the closure member is manipulable by externally disposed, manually operated actuating means.

A more specific object of this invention is to provide closure means comprising a closure plate or cover carried by a rigid, unitary mounting member which extends through the wall of the vessel and is manipulated by external actuating means, whereby articulated joints within the vessel are entirely dispensed with.

A still further object of this invention is to provide closure means for a vessel adapted for use in confined spaces, and wherein the closure member is manipulated between open and closed positions by actuating means having an operating range confined to close proximity to the vessel.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

The closure member of this invention comprises a plate slightly larger than the vessel port which it is adapted to close. The plate is mounted on an arm extending substantially parallel to the plane of the plate, and port, which arm is in turn mounted on a shaft extending through the wall of the vessel adjacent the port. Rotation of the shaft swings the plate into and away from registry with the port, thereby selectively opening and closing the vessel.

In order to permit the plate, when in registry with the port, to be sealed to the inner rim of the port, the mounting shaft, in addition to being pivoted in the wall of the vessel, is also axially slideable so that after rotation of the shaft to bring the plate into registry with the port, the shaft may be axially moved outward until the edges of the plate are firmly sealed to the inner rim of the port, in which position the shaft may be latched by any suitable latching means.

To permit easy manual operation of the closure plate, a long handle is applied to the outer end of the shaft, which handle may be swung around to correspondingly swing the closure plate into and out of registry with the port. The handle is also designed to operate as a sealing lever by means of which the mounting shaft may be pulled outwardly of the vessel, thereby to seal the closure plate to the rim of the port. For this purpose, a fulcrum is disposed adjacent the inner end of the handle, whereby a large mechanical advantage may be obtained by pressure on the outer end of the handle serving to force the mounting shaft outwardly of the vessel with multiplied force.

In the drawings, Figure 1 is a vertical sectional view of a pressure vessel for concrete, including the closure forming the subject matter of the instant invention;

Figure 2 is an enlarged view of the upper portion of the pressure vessel illustrating the closure partially open to permit escape of compressed air while still retaining concrete within the vessel;

Figure 3 is a top plan view of the vessel;

Figure 4 is a fragmentary view looking upward toward the underside of the closure plate, and taken along line 4—4 in Figure 2; and Figure 5 is a fragmentary view taken along line 5—5 in Figure 3 showing the fulcrum groove about which the handle may be pivoted to seal the closure plate against the inner rim of the vessel port.

In Figure 1 a concrete carrying vessel 11 is shown mounted on flanged wheels 12 by means of which it may be propelled along the track 13. The vessel 11 is particularly adapted for conveying mixed concrete from the mouth of a tunnel to the working region within the tunnel where a lining is being formed. In the top wall 14 of vessel 11 is formed a port or opening 15 through which concrete may be poured into the vessel 11. Around the outer rim of port 15 is secured an upwardly flared flange 16 to aid in the admission of concrete into the vessel.

Means are provided at the base of the vessel for pneumatically discharging the contents thereof. However, this means forms the subject matter of my U. S. Patent No. 2,344,703, and forms no part of the instant invention; hence a detailed description thereof is deemed unnecessary.

Inside the vessel 11, and disposed substantially horizontally immediately below the top 14, is a closure plate 17 of the same general configuration as the port 15 and extending slightly beyond the inner rim of the port. The plate 17 is mounted near its center on a horizontally extending arm 18, which is integrally formed on the end of a vertical shaft 19 extending through a vertical bushing 21 formed in the top 14 of the vessel 11. A horizontally extending handle 22 is mounted on the upper end of the shaft 19 and extends over the top 14 substantially to the outer edge of the top. Referring to Figure 2, it will be seen that a vertical slot 23 is formed in the handle 22 to receive the flattened upper end 24 of the shaft 19, the handle being pivotally connected to the shaft by means of a transverse pivot pin 25. Swinging of the handle 22 in a generally horizontal plane causes corresponding rotation of the shaft 19, in turn swinging the arm 18 and the closure plate 17 into or out of registry with the port 15, as illustrated in solid and broken lines, respectively, in Figure 3.

The slot 23 is formed slightly longer than the flattened end 24 of the shaft 19 to provide clearance therebetween so that the handle 22 may be oscillated in a vertical plane to raise or lower the shaft 19, which, in addition to being rotatable in the bushing 21, is also axially slideable therein. In order to effect axial movement of the shaft 19 by vertical oscillation of the handle 22, the latter is fulcrumed on the flange 16 by engagement of a tongue 26, formed on the inner end of the handle, with a groove 27 formed in the outer face of the flange. To accommodate the groove 27, a boss 28 (Figure 3) is formed on the flange at this point, in which the groove 27 is formed.

Referring to Figures 2 and 3, it will be seen that as the shaft 19 is rotated by the handle 22 to bring the plate 17 into registry with the port 15, the tongue 26 on the outer end of the handle simultaneously enters the groove 27 formed in the boss 28. The tongue 26 is maintained in vertical alignment with the groove 27, when the handle and plate are swung to the open position, by engagement of the handle with the vessel top at 29, as well as with the upper end of bushing 21, such engagement also serving to support the plate 17 and connected ports (Figure 2). By maintaining this engagement as the handle is moved laterally to move the plate into registry with the port 15, the tongue 26 freely enters the groove 27. The handle 22 is thus fulcrumed in the groove 27 when the plate 17 registers with the port 15, so that upward movement of the outer end of the handle causes the shaft 19 to be pulled upwardly, thereby pressing the edges of the closure plate 17 into firm engagement with a depending annular gasket 31 seated in a groove in the underside of the rim of the port 15.

The plate 17 may be secured in this closed position by a locking member 32 pivotally mounted in an eye 33 on the vessel top 14, and engageable with one of several notches 34 formed on the underside of the handle 22 (Figure 1). Pivotal movement of the locking member in one direction is limited by a projection 35 thereon which engages the vessel top. By providing a plurality of notches 34, a variable degree of pressure may be applied to the gasket 31 by the plate 17. The plurality of notches also allows for compensation in the closing adjustment as the closure mechanism wears.

In order to permit the plate 17 to be forced against the annular gasket 31 with uniform pressure over the entire area of the gasket, the plate is mounted on the arm 18 for limited universal tilting relative thereto. As shown in Figure 4, a pair of depending bearing plates 36 are formed on the underside of the plate 17, between which a boss 37 formed on the end of arm 18 extends. A trunnion pin 38 extends through the boss 37 into the bearing holes in the plates 36. Thus, free movement about the axis of the trunnion pin 38 is provided, and limited free movement about an axis parallel to arm 18 is provided by providing a loose fit between the pin 38 and the boss 37 and by forming the boss 37 narrower than the space between plates 36, thereby leaving a space 39 and forming a generally sloppy fit. The universal pivotal connection thus provided between the arm 18 and the plate 17 permits self-alignment of the plate with the gasket 31, thereby assuring uniform pressure between the plate and the gasket over the entire area of the gasket.

Swinging of the plate 17 about the axis of the shaft 19 is confined to approximately a 90° arc by means of depending bosses 41 and 42 (Figure 3) formed on the underside of the vessel top 14. In Figure 3, the solid line position of the plate and the arm 22, corresponds to the position illustrated in Figure 2, and illustrates the closure plate 17 in registry with the port 15, but not yet biased upwardly against the gasket 31. A corresponding position is illustrated in Figure 4. The position of the plate 17 and the arm 22 indicated by broken lines in Figure 3 is that assumed when the closure plate 17 is swung out of registry with the port 15 to allow admission of concrete into the vessel 11. In Figure 1, the closure plate 17 is shown in registry with the port 15 and biased upwardly against the gasket 31, being held in position by the upstanding locking member 32.

In the position shown in Figures 2 and 3, the closure member is effective to permit escape of compressed air while still blocking the ejection of concrete being agitated by compressed air within the vessel 11.

From the above it will be seen that there has been disclosed a simple closure member for a pressure vessel which member may be operated completely by hand, and the mechanism for which is substantially invulnerable to damage and interference by particles of concrete or gravel.

It will also be observed that although the major portion of the actuating mechanism is disposed externally of the vessel, it is so constructed and arranged that it is at all times entirely within the vertical confines of the vessel. This characteristic is particularly advantageous in concrete placing apparatus which is adapted to be transported and operated within tunnels wherein headroom and clearance are in many instances very limited.

Although I have described my novel closure for pressure vessels as applied to a concrete placer, it is to be understood that this is merely for the purpose of illustrating a typical application, and that the closure is equally applicable to pressure vessels of other types. It may also be used to advantage in other environments than pressure vessels.

I claim:

1. Closure apparatus comprising, in combination with a wall having an opening therein, a closure for said opening, a support member having supporting engagement with said closure, means mounting said support member on said wall for pivotal movement about an axis transverse to the plane of said opening and for rectilinear movement in the direction of said axis, actuating means operatively connected with said support member for oscillating the latter about said axis, and means providing a fulcrum for said actuating means offset from said axis, about which said actuating means may be oscillated to move said support member in the direction of said axis.

2. Closure apparatus comprising, in combination with a wall having an opening therein, a closure for said opening disposed on one side of said wall, closure mounting means comprising a shaft extending through said wall and connected at one end to said closure, bearing means mounting said shaft on said wall, said shaft being movable axially in said bearing means to move said closure rectilinearly in a direction transverse to the plane of said opening and being pivotally movable about its axis to swing said closure laterally of said opening, an operating lever disposed on the other side of said wall and connected to the other end of said shaft, said lever being swingable about said axis to pivot said shaft and thereby swing said closure laterally of said opening, and means providing a fixed fulcrum offset from said axis and engageable by said lever when said closure is in registry with said opening, said lever being pivotable about said fulcrum in a plane including said axis to move said shaft axially and thereby move said closure transversely to the plane of said opening.

3. A closure for an opening in a wall of a chamber, comprising a cover within said chamber and adapted to seal said opening at the inner side thereof, a support having an internal portion connected to said cover and having a portion extending through said wall to the exterior of said chamber, said last-named portion being mounted on said wall for pivotal and rectilinear movements, an operating member disposed externally of said chamber and connected to the external portion of said support, said operating member and support being oscillatable about a common axis to move said cover into or out of registry with said opening, and said operating member being oscillatable about an axis offset from said common axis to move said support and cover rectilinearly toward or away from said opening.

4. A closure for an opening in a wall of a chamber, comprising a cover within said chamber and adapted to seal said opening from the inner side thereof, a cover support having a portion within said chamber connected to said cover and a portion extending through said wall to the exterior of said chamber, means mounting said support on said wall for pivotal and rectilinear movements, an operating lever disposed externally of said chamber and operatively connected to the external portion of said support, said operating lever and support being oscillatable about a common axis to move said cover into or out of registry with said opening, and means forming a fulcrum offset from said common axis, said lever being engageable with said fulcrum and oscillatable thereabout when said cover is in registry with said opening, to move said support and cover rectilinearly toward or away from said opening.

5. In closure apparatus: a closure member for an opening in a member having a seat upon which said closure is adapted to seat and seal; means supporting said closure for angular movement about an axis extending in the direction in which the opening extends, as well as along said axis; an operating arm connected with said support means, for movement about said axis to impart angular movement to said support means; and means for optionally mounting said arm for movement about an axis transverse to the first mentioned axis and spaced therefrom, to impart axial movement to said support means.

6. In closure apparatus: a closure member for an opening in a member having a seat upon which said closure is adapted to seat and seal; means supporting said closure for angular movement about an axis extending in the direction in which the opening extends, as well as along said axis; an operating arm secured to said support means for angular movement therewith, as well as movement with respect thereto in a plane passing through said axis, and fixed means laterally spaced from said axis optionally engageable by a portion of said arm to form a fulcrum about which said arm is movable as a lever to cause axial movement of said support means.

7. In closure apparatus: the combination of a wall having a through opening; a closure for said opening disposed on one side of said wall; support means for said closure, including a member extending through said wall adjacent said opening; means on said wall mounting said member for axial movement to move said closure toward and away from said wall, as well as angular movement to bring said closure into and out of registry with said opening; an operating arm, means connecting said arm with said member for movement therewith about said axis to impart angular movement to said member and for pivotal movement on said member; and an element fixed to one side of said member as a fulcrum about which said arm is movable to effect axial movement to said member.

8. In closure apparatus: the combination of a wall having a through opening surrounded by a seat, on one side thereof; a closure disposed on said side of the wall; support means for said closure, including a member extending through said wall adjacent said opening; means on said wall mounting said member for axial movement to move said closure toward and away from said wall and for angular movement between limiting positions respectively in which said closure is in registry with said opening or laterally clear thereof; an operating arm connected with said member for movement therewith about said axis to impart angular movement to said member to move said closure between said limiting positions and having means thereon adapted to form a pivot; and means fixed to one side of said member engageable by the pivot means on said arm, when said closure is in registry with said opening, to form a fulcrum about which said arm is movable to cause bodily movement of said member and said closure.

9. In closure apparatus: the combination of a wall having a through opening surrounded by a seat, on one side thereof; a closure disposed on said side of the wall; support means for said closure, including a member extending through said wall adjacent said opening; means on said wall mounting said member for axial movement to move said closure toward and away from said wall and for angular movement between limiting positions respectively in which said closure is in registry with said opening or laterally clear thereof; an operating arm connected with said member for movement about said axis to impart angular movement to said member to move said closure between said limiting positions and having means thereon adapted to form a pivot; and means mounted to one side of said member engageable by the means on said arm, when said closure is in registry with said opening, to form a fulcrum about which said arm is movable to cause axial movement of said member, said mounting means and said arm having means cooperating to maintain the pivot forming means and the fulcrum forming means in alignment when said closure is spaced from said seat.

10. In closure apparatus: a closure member for for an opening in a member having a seat upon which said closure is adapted to seat and seal; means supporting said closure for angular movement about an axis extending in the direction in which the opening extends, as well as for bodily movement along said axis; an operating arm, means connecting said arm with said support means for movement therewith angularly about said axis and for pivotal movement thereon; and fulcrum means to one side of said axis engageable by a portion of said arm when said arm is in a predetermined position, to form a fulcrum about which said arm is movable in opposite directions to cause axial movement of said support means for moving said closure toward and away from said opening.

11. In closure apparatus: the combination of a wall having a through opening; a closure adapted to seal said opening, disposed on one side of the wall; supporting means for said closure, including a member extending through said wall; means on said wall mounting said member for axial as well as angular movement; an operating arm, means connecting said arm with said member for movement therewith, to cause the closure to move into and out of registry with said opening; and a fulcrum member having opposed fulcrum surfaces disposed to one side of said member and engageable by said arm when said closure is in registry with said opening and about which the arm is movable as a lever in opposite directions to cause the closure to move relative to said opening.

12. In closure apparatus: the combination of a wall having a through opening; a closure adapted to seal said opening, disposed on one side of the wall; supporting means for said closure, including a supporting member extending through said wall; means on said wall mounting said member for axial as well as angular movement; an operating arm for moving said member connected thereto for movement therewith about the axis thereof to cause the closure to move into and out of registry with said opening; a fulcrum member fixed to one side of said member forming a slot for receiving a portion of said arm to provide fulcrum surfaces about which said arm is movable in opposite directions to cause the closure to move toward and away from said opening, said slot being open at opposite ends whereby said portion of said arm may be moved into and out of the slot on movement of the arm about the axis of said supporting member.

MAXWELL F. KEMPER.

REFERENCES CITED

The following references are of record in the file of this patent:

UNITED STATES PATENTS

| Number | Name | Date |
|---|---|---|
| 145,672 | McIlhenny | Dec. 16, 1873 |
| 535,578 | Frosch | Mar. 12, 1895 |
| 1,418,530 | Burnham | June 6, 1922 |
| 1,456,877 | Kennedy | May 29, 1923 |
| 2,282,011 | Vischer | May 5, 1942 |
| 2,407,627 | Chandler | Sept. 17, 1946 |

FOREIGN PATENTS

| Number | Country | Date |
|---|---|---|
| 126,080 | Germany | Mar. 26, 1901 |
| 466,583 | Great Britain | May 28, 1937 |